Patented Mar. 29, 1938

2,112,373

UNITED STATES PATENT OFFICE 2,112,373

COPPER BASE ALLOY AND WELDING ROD

Arthur R. Lytle, Niagara Falls, N. Y., assignor, by mesne assignments, to Oxweld Acetylene Company, a corporation of New York No Drawing. Application March 28, 1936, Serial No. 71,448

3 Claims. (Cl. 75—157)

This invention relates to copper-zinc alloys adapted for use in welding, and especially for use in forming wear-resistant weld deposits.

Wearing surfaces are frequently made or renewed by depositing a copper alloy on the base surface by the so-called "bronze" welding operation. For this purpose, it is customary to use a welding rod of a modified "60–40" brass. One material of this kind is disclosed in my Reissue Patent 17,631, issued on April 1, 1930. Quite satisfactory wearing resistance is provided by these alloys under normal circumstances where great hardness is not required or an unusually high temperature is not attained. However, where the deposited metal is called upon to provide wear resistance at elevated temperatures such as those encountered when it is used in contact with superheated steam, in a steam-engine piston head for example, failure sometimes occurs from excessive wearing or flowing of the weld metal.

I have found that by modifying the composition of the material disclosed in my above-mentioned patent, there is obtained a material which retains a satisfactory hardness at temperatures as high as 500° F. or even higher. More specifically, my invention comprises a copper base alloy, and a welding rod, having a composition within the limits shown in Table A:

Table A

| | Basic composition | Preferred composition |
|---|---|---|
| Percent copper | 48 to 62 | 55 to 58. |
| Percent zinc | Remainder | 36 to 42. |
| Percent tin | 2 to 5 | 2.25 to 3.25. |
| Percent iron | 0.25 to 1.5 | 0.75 to 1.25. |
| Percent silicon | 0.01 to 1.5 | 0.01 to 0.2. |
| Percent manganese | 0 to 2 | 0.01 to 0.5. |

Material of this composition flows well during the welding operation, has a strength well over about 52,000 pounds per square inch, has a high Brinell hardness at room temperature, and retains a satisfactory hardness at temperatures up to about 500° F.

The Brinell hardness (500 kilogram load) of the material of the invention (Samples 2 through 9) and of material heretofore known (Sample 1), at room temperature and at elevated temperatures, is shown in Table B:

Table B

| Sample | Percent Cu | Percent Sn | Percent Fe | Percent Si | Percent Zn | Brinell hardness | | |
|---|---|---|---|---|---|---|---|---|
| | | | | | | 70° F. | 300° F. | 500° F. |
| 1 | 58 | 0.9 | 0.9 | 0.06 | Rest | 100 | 89 | 74 |
| 2 | 55.2 | 2.1 | 0.4 | 0.09 | ...do... | 143 | 143 | 89 |
| 3 | 57 | 2.2 | 1.18 | 0.06 | ...do... | 117 | 114 | 85 |
| 4 | 57 | 2.3 | 0.36 | 0.17 | ...do... | 130 | 130 | 89 |
| 5 | 54 | 3.2 | 0.71 | 0.11 | ...do... | 143 | 136 | 96 |
| 6 | 57 | 3.25 | 0.69 | 0.04 | ...do... | 150 | 150 | 98 |
| 7 | 57.5 | 3.55 | 0.75 | 0.04 | ...do... | 166 | 166 | 100 |
| 8 | 56.48 | 2.93 | 0.63 | 0.50 | ...do... | 158 | 156 | 100 |
| 9 | 56.52 | 2.93 | 0.47 | 0.87 | ...do... | 175 | 192 | 86 |

I claim

1. Copper base alloy for use as articles which resist surface wear at elevated temperatures below 500° F., said alloy having substantially the following composition: 48% to 62% copper, 2% to 5% tin, 0.25% to 1.5% iron, and silicon in an amount not over about 1.5%, remainder zinc.

2. Copper base alloy for use as articles which resist surface wear at elevated temperatures below 500° F., said alloy having substantially the composition: 55% to 58% copper, 2.25% to 3.25% tin, 0.75% to 1.25% iron, 0.01% to 0.2% silicon, and the remainder zinc; which alloy is characterized by improved wear resistance at elevated temperatures below about 500° F.

3. A welding rod for forming metal surfaces to resist wear at elevated temperatures below 500° F. and having approximately the composition: 57% copper, 3% tin, 0.75% iron, 0.1% silicon, remainder zinc.

ARTHUR R. LYTLE.